US009909501B2

(12) United States Patent
Caulfeild et al.

(10) Patent No.: US 9,909,501 B2
(45) Date of Patent: Mar. 6, 2018

(54) ACOUSTIC STRUCTURE FOR A GAS TURBINE ENGINE

(71) Applicant: Pratt & Whitney Canada Corp., Longueuil (CA)

(72) Inventors: Stephen Caulfeild, Rockwood (CA); Bryan Olver, Nobleton (CA); Kin-Leung Cheung, Toronto (CA)

(73) Assignee: PRATT & WHITNEY CANADA CORP., Longueuil, QC (CA)

( * ) Notice: Subject to any disclaimer, the term of this patent is extended or adjusted under 35 U.S.C. 154(b) by 581 days.

(21) Appl. No.: 14/228,375

(22) Filed: Mar. 28, 2014

(65) Prior Publication Data
US 2015/0118023 A1 Apr. 30, 2015

Related U.S. Application Data

(60) Provisional application No. 61/842,545, filed on Jul. 3, 2013.

(51) Int. Cl.
F02C 7/25 (2006.01)
F02C 7/24 (2006.01)
(Continued)

(52) U.S. Cl.
CPC ............... *F02C 7/25* (2013.01); *F02C 7/24* (2013.01); *F02K 1/827* (2013.01); *F23M 20/005* (2015.01);
(Continued)

(58) Field of Classification Search
CPC .... F02C 7/24; F02C 7/25; F02K 1/827; F05D 2220/327; F05D 2240/14; F05D 2240/15; F05D 2250/283; F05D 2260/96; F05D 2300/44; F05D 2300/502; F23M 20/005; Y02T 50/672
See application file for complete search history.

(56) References Cited

U.S. PATENT DOCUMENTS 4,308,197 A * 12/1981 Byrd ........................ C08K 5/53
428/408
4,780,359 A 10/1988 Trask et al.
(Continued)

FOREIGN PATENT DOCUMENTS

EP 0314244 5/1989
EP 1862605 12/2007
(Continued)

*Primary Examiner* — Audrey K Bradley
(74) *Attorney, Agent, or Firm* — Norton Rose Fulbright Canada LLP

(57) ABSTRACT

An acoustic structure for a gas turbine engine comprising a noise reduction layer and a fire protector layer connected to the noise reduction layer. The noise reduction includes a perforated inner wall adapted to be in contact with a first fluidic environment, and a noise reduction adjacent to the inner wall. The fire protector layer includes a non-perforated outer wall adapted to be in contact with a second fluidic environment having potentially a fire, a fire protector adjacent to the outer wall, and a pressure resisting wall disposed between the fire protector and the noise reduction. The second fluidic environment is under a pressure lower than a pressure of the first fluidic environment. The inner and outer walls are load-bearing walls of the acoustic structure.

19 Claims, 2 Drawing Sheets

(51) Int. Cl.
   *F02K 1/82*     (2006.01)
   *F23M 20/00*    (2014.01)
(52) U.S. Cl.
   CPC .... *F05D 2220/327* (2013.01); *F05D 2240/14* (2013.01); *F05D 2240/15* (2013.01); *F05D 2250/283* (2013.01); *F05D 2260/96* (2013.01); *F05D 2300/44* (2013.01); *F05D 2300/502* (2013.01); *Y02T 50/672* (2013.01)

(56) References Cited

U.S. PATENT DOCUMENTS

| | | |
|---|---|---|
| 4,926,963 A | 5/1990 | Snyder |
| 4,937,125 A | 6/1990 | Sanmartin et al. |
| 6,511,730 B1 | 1/2003 | Blair et al. |
| 7,467,687 B2 | 12/2008 | Mitchell et al. |
| 2007/0278035 A1* | 12/2007 | Mitchell ............ B63G 13/02 181/290 |
| 2010/0024435 A1 | 2/2010 | Vauchel |
| 2011/0126544 A1* | 6/2011 | Foster ............... F02K 1/822 60/752 |
| 2012/0082808 A1 | 4/2012 | Lemains |
| 2012/0285768 A1* | 11/2012 | Douglas ............ G10K 11/172 181/292 |
| 2014/0133964 A1* | 5/2014 | Ayle ................. G10K 11/172 415/119 |

FOREIGN PATENT DOCUMENTS

| | | | |
|---|---|---|---|
| FR | 2396868 A1 * | 2/1979 | ............ F02K 1/827 |
| JP | 2007320289 | 12/2007 | |
| WO | WO2010/144951 A1 | 12/2010 | |

* cited by examiner

ACOUSTIC STRUCTURE FOR A GAS TURBINE ENGINE

CROSS-REFERENCE TO RELATED APPLICATIONS

This application claims priority to U.S. provisional application No. 61/842,545, filed Jul. 3, 2013, the entire contents of which are herein incorporated by reference.

TECHNICAL FIELD

The application relates generally to aircraft engines and, more particularly, to acoustic structures for use therein.

BACKGROUND OF THE ART

Acoustic structures are commonly used in aircraft engines, such as turbofan engines, to reduce a noise impact of the engine to the environment. In order to protect the acoustic structures from the debilitating effects of fire, external blankets, coatings or metallic shields may be added to the acoustic structure. These protections are however structurally parasitic, i.e. they act only to thermally protect the underlying structure and do not play an active role in supporting any structural loading. These fire protections also include additional cost, complicated maintainability and access, and inspectability restriction and complex reparability.

SUMMARY

In one aspect, there is provided an acoustic structure for a gas turbine engine, the acoustic structure comprising: a noise reduction layer including: a perforated inner wall adapted to be in contact with a first fluidic environment, the inner wall being a load-bearing wall of the acoustic structure; and a noise reduction adjacent to the inner wall; and a fire protector layer connected to the noise reduction layer, the fire protector layer including: a non-perforated outer wall adapted to be in contact with a second fluidic environment having potentially a fire, the second fluidic environment being under a pressure lower than a pressure of the first fluidic environment, the outer wall being a load-bearing wall of the acoustic structure; a fire protector adjacent to the outer wall; and a pressure resisting wall disposed between the fire protector and the noise reduction.

In another aspect, there is provided a gas turbine engine comprising: an acoustic structure separating a first fluidic environment and a second fluidic environment having potentially a fire, the first fluidic environment being under a pressure higher than a pressure of the second fluidic environment, the acoustic structure including: a noise reduction layer including: a perforated inner wall in contact with the first fluidic environment; and a noise reduction adjacent to the inner wall; and a fire protector layer connected to the noise reduction layer, the fire protector layer including: a non-perforated outer wall in contact with the second fluidic environment; a fire protector adjacent to the outer wall; and a pressure resisting wall disposed between the fire protector and the noise reduction, a pressure load being exerted by the first fluidic environment onto the inner wall, the inner wall and the outer wall being subjected to a mechanical load at an angle with the pressure load.

DESCRIPTION OF THE DRAWINGS

Reference is now made to the accompanying figures in which.

DETAILED DESCRIPTION

Figure 1:
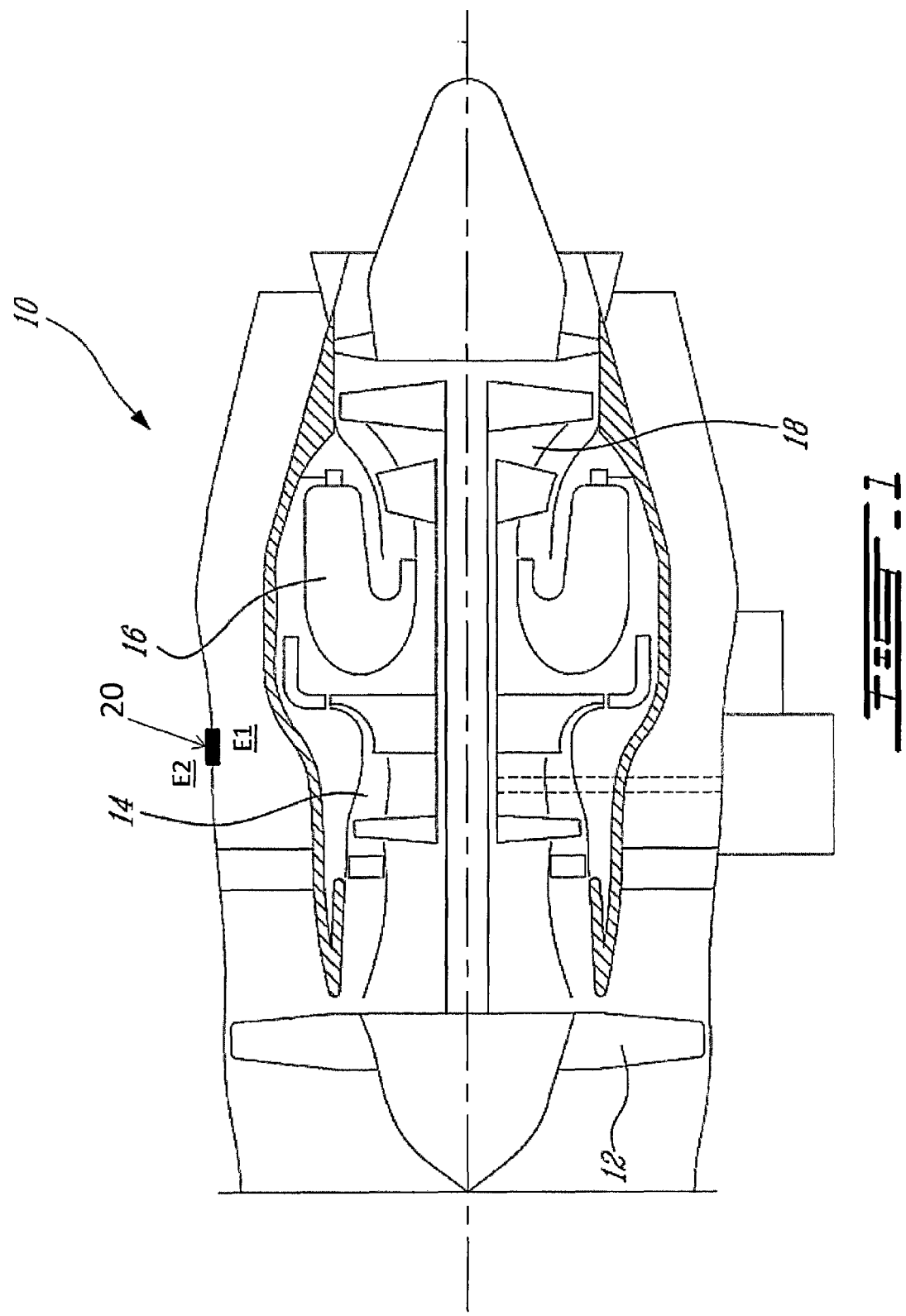
FIG. 1 is a schematic cross-sectional view of a gas turbine engine.

FIG. 1 illustrates a gas turbine engine 10 generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

Figure 2:
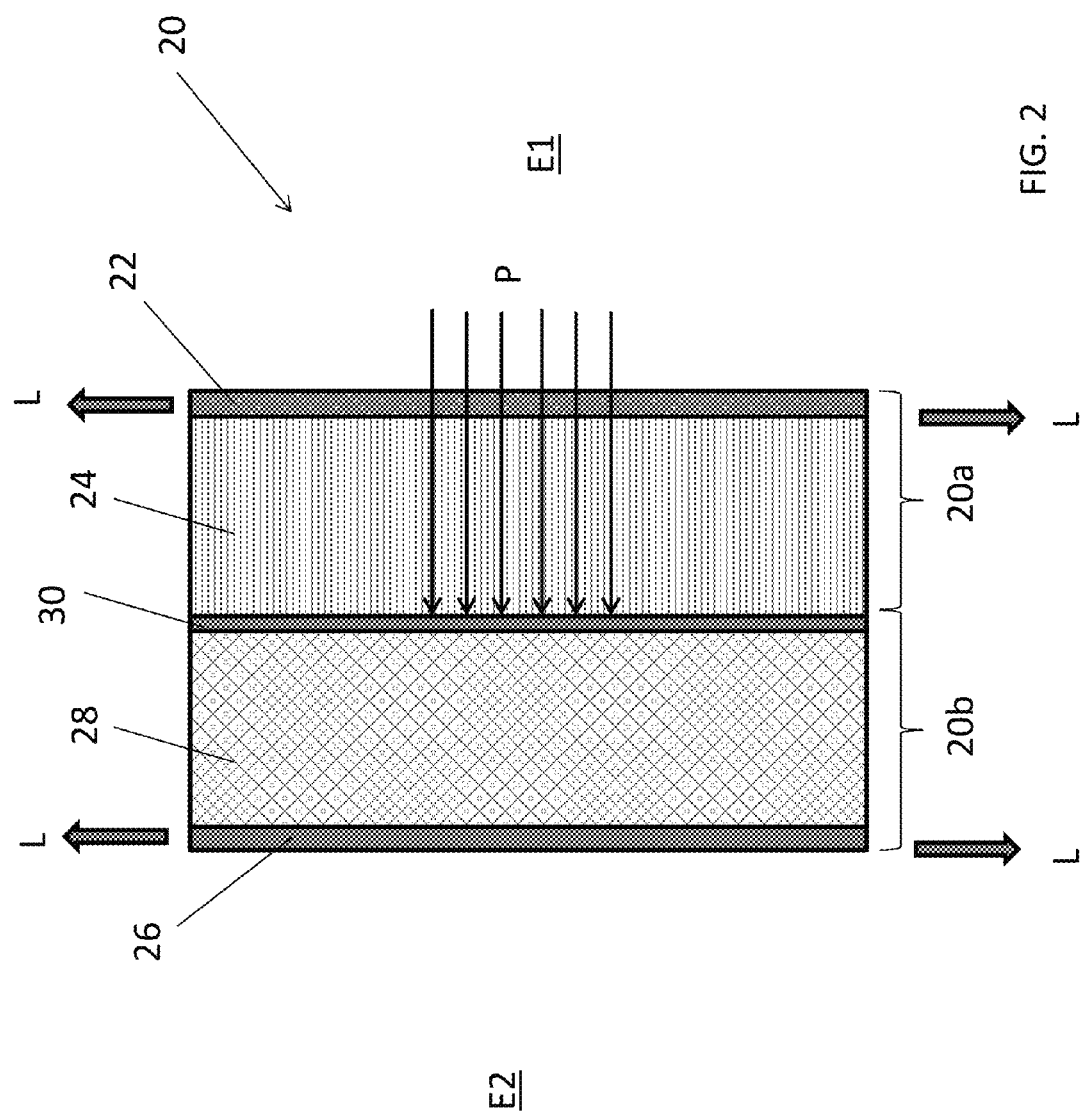
FIG. 2 is a schematic cross-sectional view of an acoustic structure for the gas turbine engine of FIG. 1.

FIG. 2 shows a cross-section of an acoustic structure 20 for use in a gas turbine engine such as the gas turbine engine 10. The acoustic structure 20 may be used on outer ducts, such as a bypass passage of a turbofan engine or fan ducts, for insulating the environment from sounds produced by the gas turbine engine 10. Depending on the engine, the acoustic structure 20 may also be used on thrust reversers, intermediate case, tailcone, jet pipes, fan cases, nacelle inlet, inner bypass ducts to name a few.

When in use, the acoustic structure 20 is on one side exposed to a first fluidic environment E1, and on another side to a second fluidic environment E2 of the gas turbine engine 10. The first fluidic environment E1 is an environment subject to sounds, such as the sounds originating from the combustor 16 or the fan 12. The second fluidic environment E2 is an environment that could potentially be under fire. The first fluidic environment E1 is under a pressure higher than that of the second fluidic environment E2. In one embodiment, the second fluidic environment E2 is at ambient pressure.

When in use, the acoustic structure 20 is subject to pressure loads P induced by the higher pressured first fluidic environment E1, and to mechanical loads L originating from components of the engine 10 where the acoustic structure 20 is used. The mechanical loads L may be tension or compression or shear or any of the above depending where the acoustic structure 20 is used (e.g. rear mount structure, thrust reverser weight, drag). The mechanical loads L are at an angle with respect to the pressure loads P. The pressure loads P are normal to the acoustic structure 20. The pressure loads P may vary during the course of use of the acoustic structure 20 depending on a regime of the gas turbine engine 10.

To account for the acoustics and the fire hazards, the acoustic structure 20 is, in one embodiment, constructed as a double-layered structure: a noise reduction layer 20a adapted to be in contact with the first fluidic environment E1, and an adjacent fire protector layer 20b adapted to be in contact with the second fluidic environment E2. By "noise reduction", one should understand a layer of material or absence thereof that at least diminishes by its presence an amount of sounds. By "fire protector", one should understand a layer of material or absence thereof that at least diminishes by its presence the devastating effects associated with a fire on a structure disposed behind the fire protector.

The noise reduction layer 20a includes an inner wall 22 in contact with the first fluidic environment E1 and a noise reduction 24. The fire protector layer 20b includes an outer wall 26 in contact with the second fluidic environment E2, a fire protector 28 and a pressure resisting wall 30 disposed between the fire protector 28 and the noise reduction 24. The environments E1 and E2 include, in one embodiment, fluid flow such that the inner wall 22 could be a flow boundary surface for the fluid flow and form part of an aerodynamic surface for guiding the flow of fluid, such as air.

The inner wall 22 is a perforated structural component of the acoustic structure 20. The inner wall 22 is a structural component in that it is a load-bearing wall of the acoustic structure 20, i.e. it carries some of the mechanical loads L. The inner wall 22 is perforated to allow the sound pressure to fill dead air cavities in the noise reducer 24 which acts as a sound damping muffler. The inner wall 22 could be made of any material resistant enough to support the stresses causes by the mechanical loads L and be damage tolerant with respect to the numerous of holes in it. In one embodiment, the inner wall 22 is made of carbon fiber epoxy. In one embodiment, the inner wall 22 is made of aluminum. In one embodiment, the inner wall 22 is made of glass fibers.

The outer wall 26 is a non-perforated structural component of the acoustic structure 20 which may protect the pressure resisting wall 30 from fire. The outer wall 26 is a structural component in that it is a load-bearing wall of the acoustic structure 20, i.e. it carries some of the mechanical loads L. The outer wall 26 could be made of any material resistant enough to support the stresses caused by the mechanical loads L. The outer wall 26 may be made of a fire retardant material. In one embodiment, the outer wall 26 is made of carbon fiber epoxy. In one embodiment, the outer wall 26 is made of aluminum. In one embodiment, the outer wall 26 is made of glass fibers. The inner and outer walls 22, 26 could or could not be made of a same material.

The pressure resisting wall 30 is disposed between the inner wall 22 and the outer wall 26. The pressure resisting wall 30 is non-perforated in order to support the pressure loading P transmitted through the perforations of the inner wall 22. The pressure resisting wall 30 may prevent the outer wall 26 from experiencing the pressure loads P from the first fluidic first fluidic environment E1. The pressure resisting wall 30, by protecting the outer wall 26 from the pressure loads P, may at least delay an alteration of the outer wall 26 by a fire in the second fluidic environment E2. The pressure resisting wall 30 is thick enough to support the pressure loads P without altering (e.g. buckling or bursting). The pressure resisting wall 30 could be made of any material resistant enough to support the stresses caused by the pressure loads P. In one embodiment, the pressure resisting wall 30 is made of carbon fiber epoxy. In one embodiment, the pressure resisting wall 30 is made of aluminum. In one embodiment, the pressure resisting wall 30 is made of glass fibers. In other embodiments, the pressure resisting wall 30 is a fibre and matrix composite, where the fibres could be, non-exhaustively carbon, glass, ceramic, boron, and where the matrix could be, non-exhaustively, organic polymer, ceramic, thermoset, thermoplastic, or metal. The pressure resisting wall 30 may be rigid or flexible. The pressure resisting wall 30, inner 22 and outer walls 26 could or could not be made of a same material. The pressure resisting wall 30 and the inner wall 22 may be selected in accordance to the noise reduction requirements of the engine 10.

A space between the inner wall 22 and the pressure resisting wall 30 may be filled with the noise reduction 24. The noise reducer 24 attenuate sounds coming from the first fluidic environment E1. A thickness of the noise reducer 24 may be determined to absorb the required sound frequency (ies) of the sounds. In one embodiment, the noise reduction 24 is a honeycomb structure. The honeycomb structure includes a plurality of dead air cavities which contributes to the noise reduction. In one embodiment, the honeycomb structure is made of aluminum, fiberglass or Fibrous, Aramid Base, Phenolic coated.

A space between the outer wall 26 and The pressure resisting wall 30 may be filled with the fire protector 28. The fire protector 28 works as a protection to The pressure resisting wall 30 and the noise reducer 24. The fire protector 28 prevents heat transfer through radiation and minimizes the amount of oxygen present in the cavity it fills. A thickness of the fire protector 28 may be determined in function of an intensity of a potential fire. A thicker fire protector 28 may be used for more virulent fires. In one embodiment, the fire protector 28 is a fire retardant. In one embodiment, the fire protector 28 is a foam. In one embodiment, the fire protector 28 is an open or a closed cell foam. In one embodiment, the fire protector 28 is a gap of air. In one embodiment, the fire protector 28 is an aluminum honeycomb structure. In one embodiment, the fire protector 28 is a glass honeycomb structure. In one embodiment, the fire protector 28 is a glass bead filled resin. In one embodiment, the fire protector 28 is made of a thermal insulating material. Examples of thermal insulating materials include non-exhaustively balsa wood, silicone rubber, intumescent materials, and fibrous ceramic paper.

The inner wall 22, outer wall 26, pressure resisting wall 30, noise reducer 24 and fire protector 28 may be glued, riveted or bonded together. Inner wall 22, outer wall 26, pressure resisting wall 30, noise reducer 24 and fire protector 28 are shown herein to be parallel to each other with a constant thickness. It is however contemplated that at least one of the inner wall 22, outer wall 26, wall 30, noise reducer 24 and fire protector 28 could be inclined and that depending on the application, the inner wall 22, outer wall 26, pressure resisting wall 30, noise reducer 24 and fire protector 28 could have varying thicknesses.

In normal operation, the acoustic structure 20 behaves as an integral acoustic structure. However, during a fire attack, the outer wall 26 and fire protector 28 protect the pressure resisting wall 30 from direct flame impingement whilst the pressure resisting wall 30 isolates the outer wall 26 from the pressure loading P enabling it to best withstand the flame attack.

By structurally integrating acoustic and fire insulation features into a double-layered construction, parasitic weight is reduced or in some cases eliminated. The double-layered acoustic wall is easy to manipulate and adaptable in a variety of environments.

The above description is meant to be exemplary only, and one skilled in the art will recognize that changes may be made to the embodiments described without departing from the scope of the invention disclosed. The gas turbine engine described herein is only one example of engine that may accommodate the acoustic structure. The acoustic structure may for example, be used in turborprop engines or any other engines where a fire resistant acoustic structure is needed. Although the acoustic structure is shown here for use in a gas turbine engine, it is contemplated that the acoustic structure could be used in any environment where acoustic insulation on one side of the acoustic structure and fire insulation is required on the other side of the acoustic structure and where one side of the structure is subject to a high pressure. Still other modifications which fall within the scope of the present invention will be apparent to those skilled in the art, in light of a review of this disclosure, and such modifications are intended to fall within the appended claims.

The invention claimed is:

1. A bypass duct defining a bypass passage configured to receive compressed air from a fan of a gas turbine engine, the bypass duct comprising:

a perforated inner wall delimiting a boundary surface of the bypass passage, the bypass passage defining a first fluidic environment of bypass gas flow of the gas turbine engine, the first fluidic environment being under a bypass pressure, the inner wall being a load-bearing wall of the bypass duct; and a non-perforated outer wall spaced apart from the inner wall and in contact with a second fluidic environment having potentially a fire, the second fluidic environment being under an ambient pressure lower than the bypass pressure of the first fluidic environment, the outer wall being a load-bearing wall of the bypass duct;

a noise reducer adjacent to the inner wall and extending towards the outer wall;

a fire protector adjacent to the outer wall and extending towards the inner wall to reduce heat transfer across the fire protector, the fire protector having a thickness determined as a function of the potential fire; and a non-perforated pressure resisting wall disposed between the fire protector and the noise reducer and exposed to the bypass pressure of the first fluidic environment through the inner wall and the noise reducer, the pressure resisting wall having a thickness to support a pressure load exerted by the bypass pressure.

2. The bypass duct as defined in claim 1, wherein at least one of the inner wall, the pressure resisting wall, and the outer wall is made of carbon epoxy.

3. The bypass duct as defined in claim 1, wherein the fire protector is a gap of air.

4. The bypass duct as defined in claim 1, wherein the fire protector is made of closed cell foam.

5. The bypass duct as defined in claim 1, wherein the noise reducer includes a honeycomb structure.

6. The bypass duct as defined in claim 1, wherein the noise reducer absorbs predetermined sound frequency.

7. The bypass duct as defined in claim 1, wherein the outer wall, the noise reducer, the fire protector and the pressure resisting wall are one of bonded, riveted and glued to the pressure resisting wall.

8. The bypass duct as defined in claim 1, wherein the fire protector is a fire retardant.

9. The bypass duct as defined in claim 1, wherein the inner wall and outer wall are parallel.

10. A gas turbine engine comprising:
a fan; and
a bypass duct in fluid communication with the fan for receiving compressed air therefrom, the bypass duct defining a bypass passage downstream of the fan, the bypass passage defining a first fluidic environment having a bypass pressure, the bypass duct comprising:

a perforated inner wall delimiting a boundary surface of the bypass passage, the inner wall being in direct contact with the first fluidic environment; and a non-perforated outer wall spaced apart from the inner wall and in contact with a second fluidic environment having potentially a fire, the second fluidic environment having an ambient pressure lower than the bypass pressure;

a noise reducer adjacent to the inner wall and extending towards the outer wall;

a fire protector adjacent to the outer wall and extending towards the inner wall to reduce heat transfer across the fire protector, the fire protector having a thickness determined as a function of the potential fire; and a non-perforated pressure resisting wall disposed between the fire protector and the noise reducer and exposed to the bypass pressure of the first fluidic environment, the pressure resisting wall having a thickness to support a pressure load exerted by the bypass pressure, the pressure load being transmitted to the pressure resisting wall through the inner wall and the noise reducer, the inner wall and the outer wall being subjected to a mechanical load at an angle with respect to the pressure load.

11. The gas turbine engine as defined in claim 10, wherein the mechanical load is in-plane with at least one of the inner wall and the outer wall.

12. The gas turbine engine as defined in claim 10, wherein at least one of the inner wall, the pressure resisting wall, and the outer wall is made of carbon epoxy.

13. The gas turbine engine as defined in claim 10, wherein the fire protector is a gap of air.

14. The gas turbine engine as defined in claim 10, wherein the fire protector is made of closed cell foam.

15. The gas turbine engine as defined in claim 10, wherein the fire protector is made of a thermal insulating material.

16. The gas turbine engine as defined in claim 10, wherein the noise reducer includes a honeycomb structure.

17. The gas turbine engine as defined in claim 10, wherein the noise reducer absorbs a predetermined sound frequency.

18. The gas turbine engine as defined in claim 10, wherein the outer wall, the noise reducer, the fire protector and the pressure resisting wall are one of bonded, riveted and glued together.

19. The gas turbine engine as defined in claim 10, wherein the fire protector is a fire retardant.

* * * * *